United States Patent [19]
Gilbert, Sr.

[11] Patent Number: 5,224,445
[45] Date of Patent: Jul. 6, 1993

[54] BOILER WATER LIQUID LEVEL CONTROL

[76] Inventor: Lyman F. Gilbert, Sr., 6871 Cartilla Ave., Alta Loma, Calif. 91701

[21] Appl. No.: 712,178

[22] Filed: Jun. 7, 1991

[51] Int. Cl.⁵ .......................... F16K 37/00; F24D 3/00
[52] U.S. Cl. ................... 122/448.1; 237/8 R; 137/94; 137/392
[58] Field of Search ...................... 122/448.1; 237/8 R, 237/66; 137/94, 392

[56] References Cited
U.S. PATENT DOCUMENTS 4,020,488  4/1977  Martin et al. .................. 137/392 X
4,491,146  1/1985  Sveds ........................ 137/392 X

*Primary Examiner*—Arnold Rosenthal
*Attorney, Agent, or Firm*—Donald D. Mon

[57] ABSTRACT

A liquid level control principally for boiling water boilers sensitive to the presence or absence of liquid at an upper and at a lower control level. The control enables the boiler to be fired when liquid is at or above the upper level. It prevents firing and enables addition of make-up liquid when the liquid level is below the upper control level, except when the system indicates there is liquid at the upper control level, and that there is no liquid at the lower control level.

3 Claims, 5 Drawing Sheets

BOILER WATER LIQUID LEVEL CONTROL

FIELD OF THE INVENTION

This invention relates to control of the liquid level in boiling water boilers.

BACKGROUND OF THE INVENTION

The regulation of liquid water level in a boiling water boiler is a very old and highly developed art. Hundreds of thousands of these systems exist, and in every one of them the maintenance of a correct liquid water level is a critical matter. Absence of sufficient liquid water can lead to serious damage and occasionally to violent explosions. Very detailed standards are written for them, many of them being specified by insurance carriers who insure these systems.

Any adequate system willinclude means to sense a too-low level, and shut off the burners until a suitable level is restored. Also they include means to add water to restore the boiler water to a safe liquid level, and then permit the boiler system to return to operation.

In view of what would seem to be a simplistic situation amenable to little more than an off-on switch for control, it is surprising that there is a perceived need to make the safety standards more rigorous, and that it requires inventive efforts to attain these objectives, yet such is the present situation.

If it were only a matter of simply maintaining the liquid water level at or above some lower level, with the boiler in continuous operation and all systems functioning correctly, there would be no perceptible problem. But still malfunctions and explosions do occur. It is an object of this invention to provide a liquid water level control system which is sensitive not only to correct and incorrect liquid water levels, but which is also sensitive to, and reactive to, control system malfunctions.

The term "liquid level" is used herein to describe the interface between the liquid phase and the next phase above it. This next phase will usually be a gas, for example steam, but it might instead be a foam. What is important to this invention is the fact that the electrical conductivity of the liquid will be many times greater than that of the gas, vapor, or foam phase above it. The objective is, of course, to maintain an adequate supply of liquid such that the reservoir does not get dangerously low and such that there is always sufficient liquid to supply the necessary other phase or phases, such as steam for the radiators. For convenience in disclosure, water will be used as the example in the following specification, because it is the most important liquid commercially. However, any conductive liquid may be considered equivalent to it.

While this invention is useful with any type of boiler that utilizes a conductive liquid, especially water, its greatest utility is in the rather elementary boiler systems that are used for steam heating systems in residences and office buildings.

Such systems generally use a boiler which is frequently made of cast iron, that is fired on its outer surfaces by flames from coal, gas or heating oil. These boilers are typically unattended in the sense that there is no full time boiler operator. Almost universally they are operated intermittently, because heat is provided only during working and waking hours. Late at night these systems may be shut down, and are re-started the next morning, usually under time clock control. Such supervision as exists is generally exercised by a building superintendent. These persons are not often admired for their grasp of technology, and many of them can be counted on to disable safety circuitry which might require them to get up in a very cold early morning.

It is another object of this invention to provide a liquid level control system which is unlikely to give false alarms, and which will not permit a shut-down system to restart except in the course of an approved and safe series of events. It will shut down the burners and prohibit automatic restart when certain events occur in an incorrect sequence respective to a control system malfunction.

It is therefore an object of this invention to provide control circuitry for boiler systems which provides optimum protection against boiler malfunctions.

BRIEF DESCRIPTION OF THE INVENTION

This invention is carried out in combination with a boiling water boiler in which the liquid water level must be maintained at or above some prescribed lower level. The boiler is externally fired by a burner that is adapted to be turned on and shut off by the control.

An upper sensor and a lower sensor are disposed at different elevations in the boiler. The upper sensor is responsive to water at a prescribed upper intended water level. The lower sensor is at a prescribed lower intended water level, but one which is still safe for the boiler in the event that the burner continues to burn even if the upper sensor has failed. The burner will be shut off when either of the sensors detects that the water level in the boiler is beneath its respective elevation. In this specification, the terms "wet" and "dry" will be used to denote the condition where the liquid water level is high enough to contact the respective sensor (wet), or low enough that it does not (dry).

According to a feature of this invention circuitry is provided which, when the upper sensor is dry and the lower sensor is wet, enables the system to resume burner operation after the water level has again reached the upper sensor. This is an approved automatic sequence of events.

According to yet another feature of this invention, lock-out circuitry is provided responsive to the erroneous sequence in which the upper sensor's response is wet, but the lower sensor's response is dry. This may reflect a number of problems, all of them serious. Examples are the failure of the upper sensor or of some part of its responsive circuitry. After this unapproved sequence occurs, the system is locked down, and cannot be restarted except by manual actuation of a restart circuit. This prohibits re-start of the system until after the operator has actually checked out the boiler and controls, because any sequence in which the upper sensor reads wet and the lower one reads dry is clearly out of control.

The above and other features of this invention will be fully understood from the following detailed description and the accompanying drawings, in which:

DETAILED DESCRIPTION OF THE INVENTION

Figure 1:
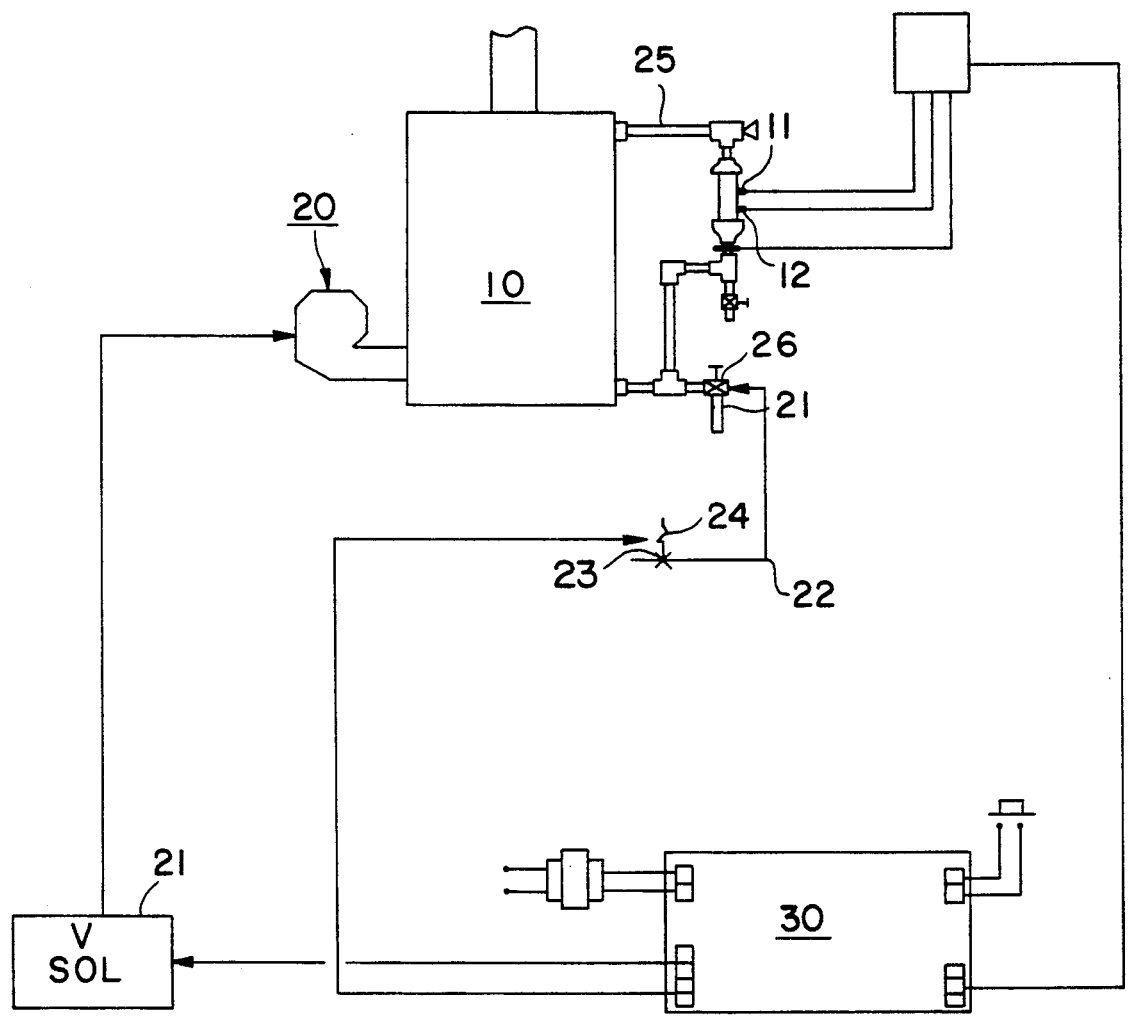
FIG. 1 is a schematic drawing showing a boiler system which incorporates the invention.

A boiler 10 is shown in FIG. 1, with an upper sensor 11 and a lower sensor 12. The upper sensor is placed at the elevation respective to the lowest desired operating water level for the system. The lower sensor is placed just below it, usually not more than an inch below it. There will remain sufficient water in the boiler at this lower elevation that the boiler will not be harmed, but it represents the absolute lowest level to which the water should go.

Any suitable type of sensor can be utilized, including mechanical sensors such as float systems. However, conductive electrodes are preferred, because they can be connected directly into the control systems and have no moving parts. When wet with liquid water they will conduct, either with themselves or with a grounded tank. When dry (or more precisely out of the water), they will not conduct, because the system circuit is through water in the tank at the level of the electrode, whatever the circuit arrangement may be.

A burner 20 fires the boiler. It can be any desired type of controllable burner subject to being turned on or shut-off. Gas and oil burners employ direct fuel control valves. Coal fired burners use air control valves that control a blower that supplies air to a glowing bed of coal. All are within the meaning of the term "burner". The burners are under control of a solenoid actuated valve 21, which will control the supply of air to a burning solid fuel such as coal, or will control the flow of fuel oil or gas.

A water supply line 22 connects to the bottom of the boiler, under control of a valve 23. Valve 28 itself is under control of a solenoid 24. Conventional balance piping 25 communicates with the top and bottom of the boiler, and incorporates a blowdown valve 26 which is operated to reduce excess solids in the water, The purpose of this invention is to control a fuel control valve and a water make-up valve. The objective is to enable the boiler to fire when there is sufficient water in the boiler, to prevent firing when the water level is too low, and to supply make up water when the water is too low, with the fuel supply shut down.

The operation this far is known. What this invention further accomplishes is a complete system shut down-no fuel supply and no make up water when an impermissible sequence of signals is provided by the upper and lower sensors. Then an alarm sounds, and the system locks down. It cannot be re-started automatically. It requires the manual operation of the control by an operator and thereby assures that the suspicious circumstances will have been investigated and corrected. In fact the system cannot be restarted at all until the circumstances which caused it have been corrected.

FIGS. 2-5 employ circuit schematic notation to show the logic of the invention. It will be understood that the various illustrated circuit segments actually form only a part of an entire circuit, but these are the parts whose functions control the supply of fuel and of make up water.

Level electronics 80 are shown as a box and are simply receptive to current flow through the two electrodes. The electrodes are connected to a power supply 81, usually involving a step down transformer 32 which supplies 24 volts a.c. which will be rectified to d.c. as required. The upper electrode is connected to level electronics 30 by lead 33, and the lower electrode is connected to them by lead 34. Ground lead 35 is connected to the tank or to respective sides of the electrodes as appropriate.

The electrodes are the only sensors in the system. They current flow through them when wetted by liquid (usually water), and do not enable it when not so wetted. The level electronics provide a source of current to the electrode terminals, and the response is detected in the level electronics.

The function of level electronics 30 is to control the switching conditions of a pair of relays, which in turn control the solenoids that set the fuel and make up water valves.

There also are provided an optional reset circuit 36 and an alarm circuit 87. It will be recognized that fuel limit circuitry 38 and make up water circuitry 89 are the controlling link in a power loop that controls the application or absence of power to the valve controls. The entire circuits are not shown, because their details are not essential to an understanding of the invention.

Figure 2:
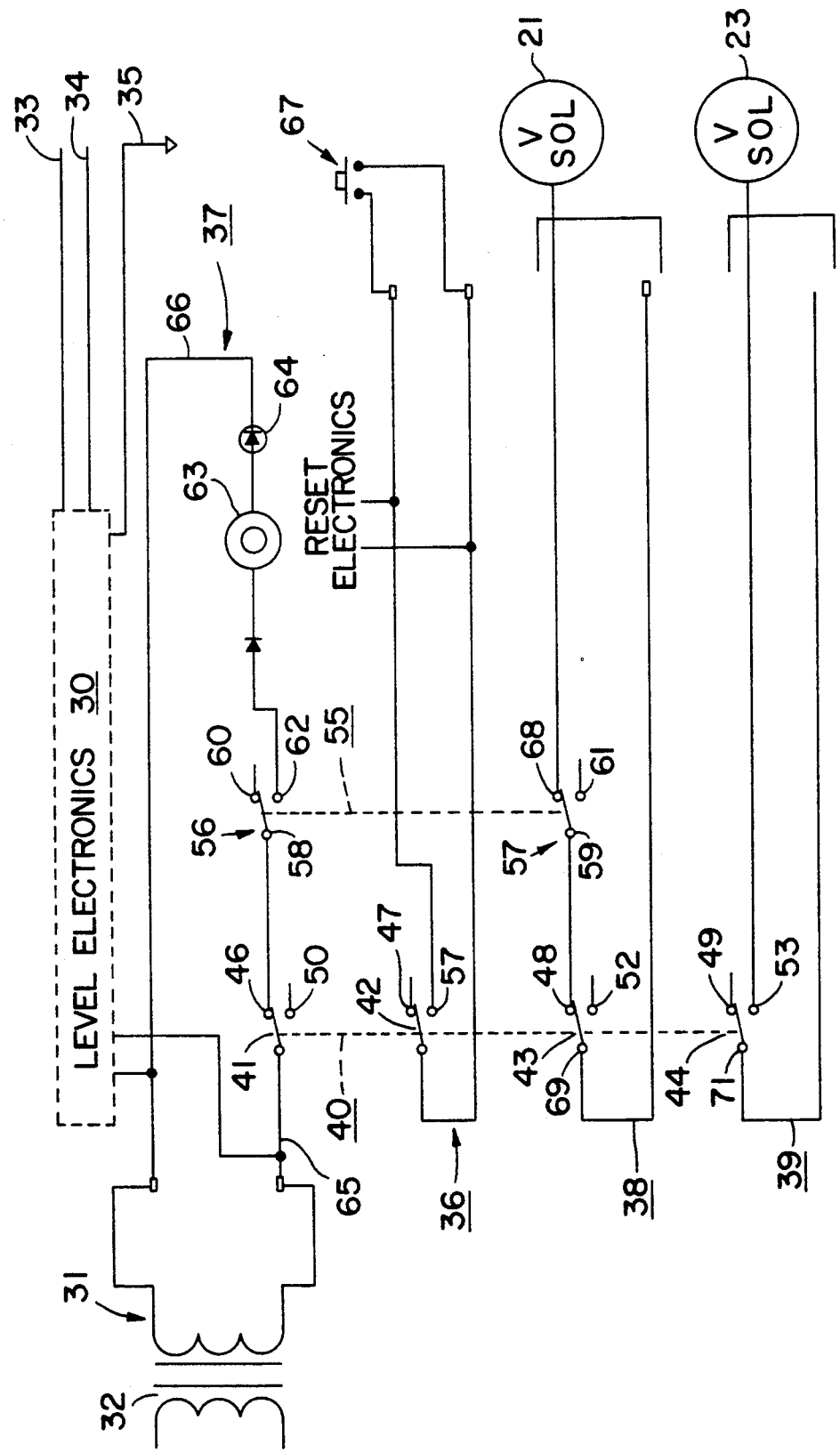
FIGS. 2, 3, 4 and 5 show relay logic settings for respective conditions under the control of the invention.

An upper level relay 40 (or more precisely, a relay responsive to conduction at the upper electrodes) has four switching elements 41, 42 43 and 44. Each switching element is a two position switch whose actuated condition is shown in FIG. 2. The switch blades are commonly shifted by a solenoid (not shown) included in the level electronics 30, and responsive to the condition of the upper electrode. In FIG. 2 they are shown against contacts 46, 47, 48, 49. Their other contacts 50, 51, 52, 53 will be contacted in the relay's alternate unactuated switching condition.

A lower level relay 55 has two switching elements 56, 57. Again, each switching element is a two position switch whose blades are commonly shifted by a solenoid (not shown) included in level electronics 30 and responsive to the conducting or nonconducting condition of the lower electrode.

The fixed contacts 58, 59 of these elements are respectively connected to contacts 46 and 52 of switching elements 41 and 43 in relay 40.

Contacts 60, 61 of elements 56 and 57 in relay 55 have no connections to them. Contacts 50,47,52, and 53 or relay 40 also have no connections to them.

Contact 62 connects to an alarm consisting of a buzzer 63 and a light 64. The alarm connects to the power source through leads 65,66. Contact 51 of element 42 connects to a reset switch 67. Reset electronics (not shown) are also connected across the reset button.

Fuel solenoid valve 21 is connected to terminal 68 of element 57 and to contact 69 of element 42. When the circuit is completed through elements 43 and 57, the solenoid valve will open to permit fuel flow.

Make up water solenoid valve 23 is connected to terminal 53 of element 44, and to contact 71 of element 44. When a circuit is made through element 44, the water make up valve will open.

It is obvious that the level electronics will supply current to these circuits, and the details are unnecessary to an understanding of this invention. This invention resides in the relay logic and sequence surveillance shown in the Figs., and the following truth table with reference to the electrode sequence and conditions of FIGS. 2-5.

| | ELECTRODE | | FUEL | OUT OF | WATER |
|---|---|---|---|---|---|
| | TOP | BOT | LIMIT | SEQUENCE | MAKE-UP |
| FIG. 2 | 1 | 1 | 1 | 0 | 0 |

-continued

Figure 3:
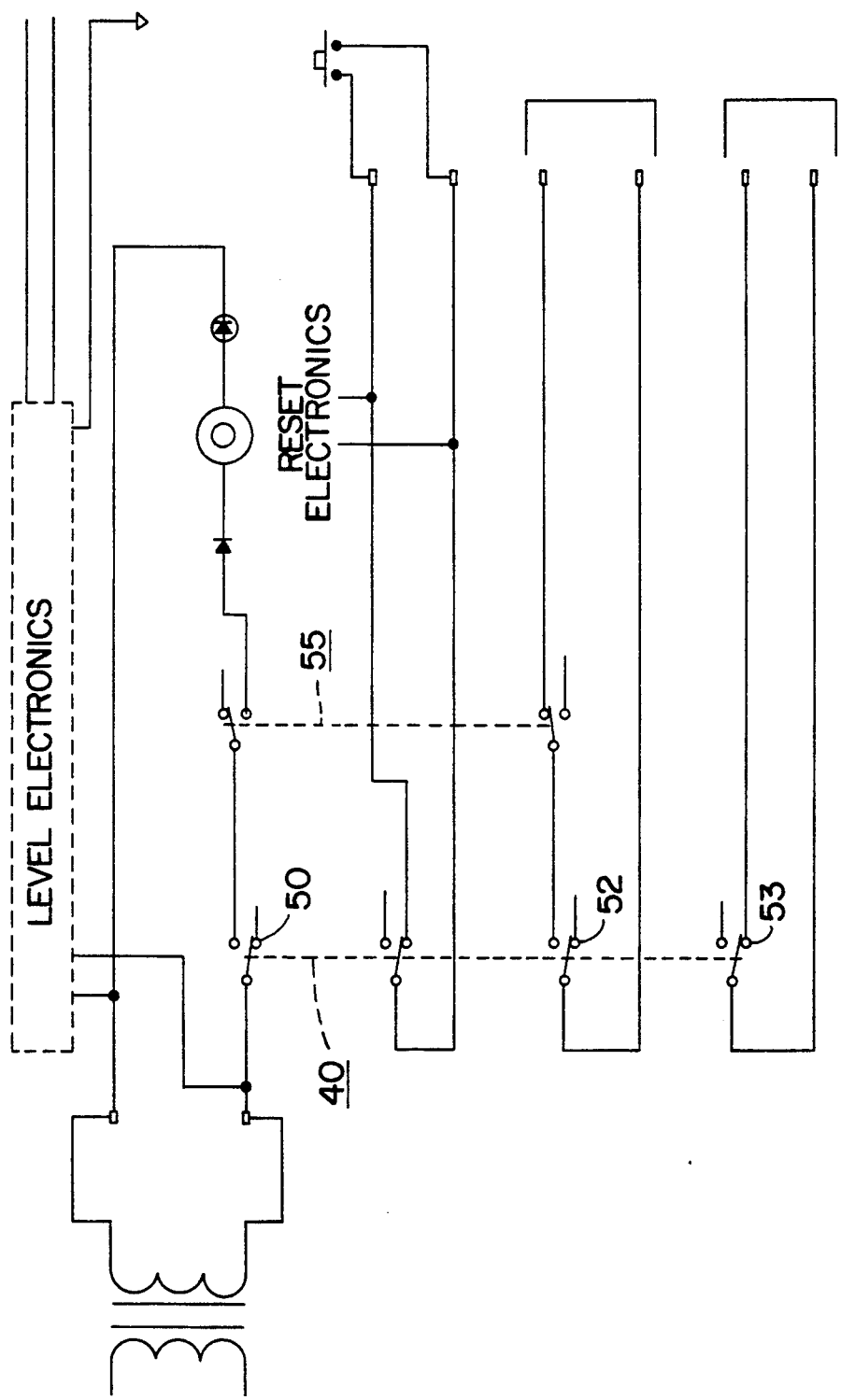
Figure 4:
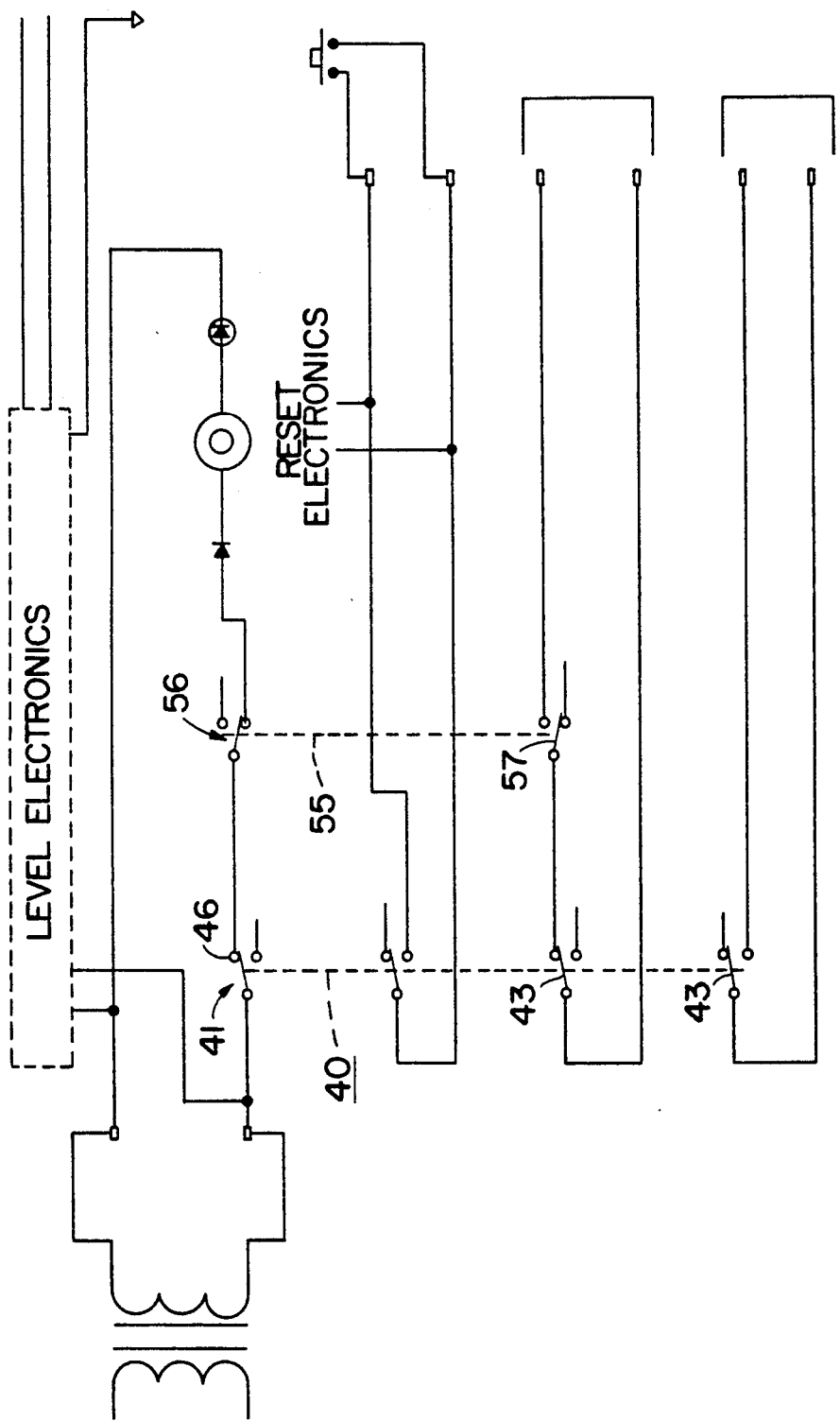
Figure 5:
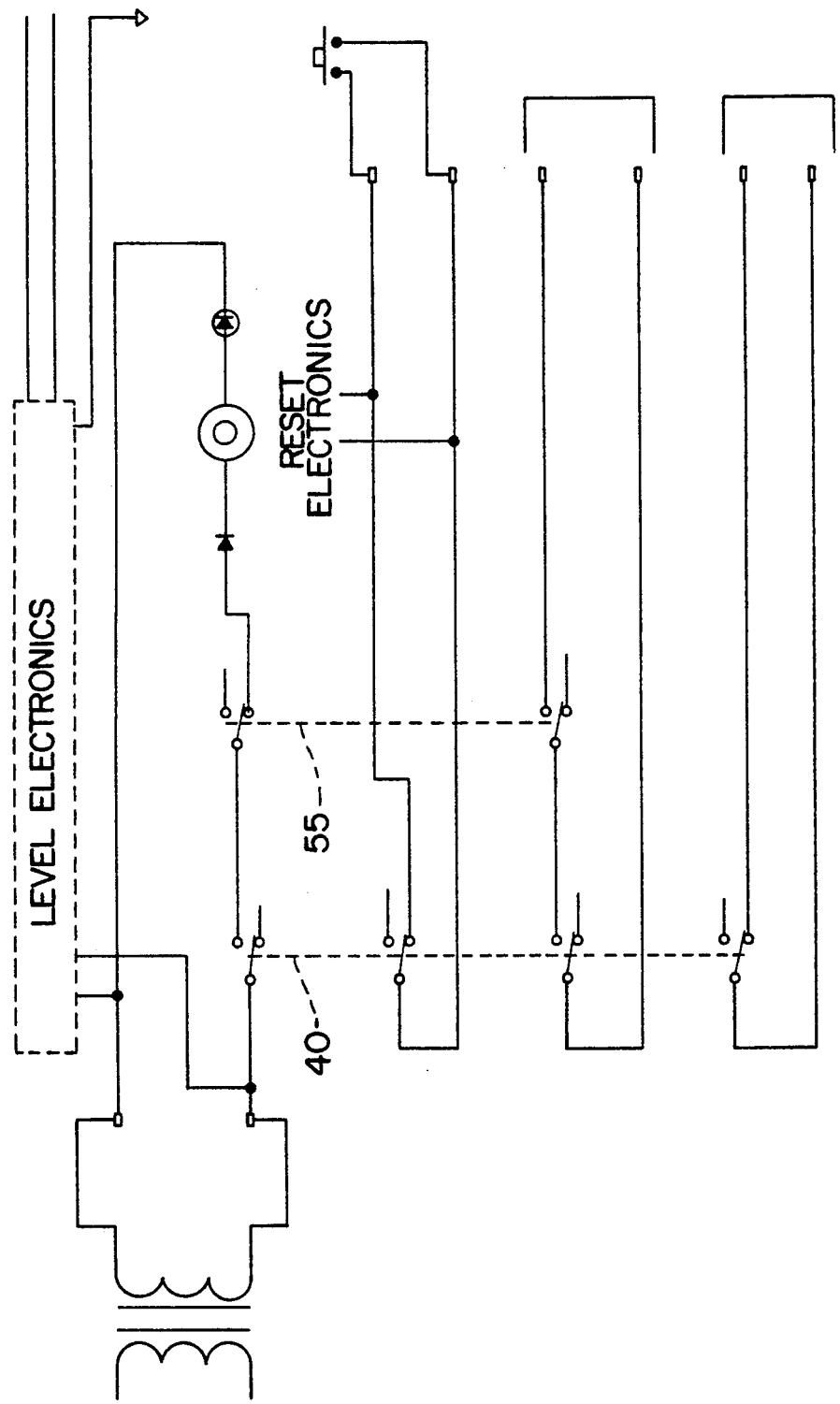

|  | ELECTRODE | | FUEL | OUT OF | WATER |
|--- | --- | --- | --- | --- | --- |
|  | TOP | BOT | LIMIT | SEQUENCE | MAKE-UP |
| FIG. 3 | 0 | 1 | 0 | 0 | 1 |
| FIG. 4 | 1 | 0 | 0 | 1 | 0 |
| FIG. 5 | 0 | 0 | 0 | 0 | 1 |

In this table, "1" as applied to the electrodes means it is conducting and "0" that is is not. For the valves, "1" means it is open to flow, and "0" means that is is closed to flow. As to "out of sequence" "1" means that the alarm is actuated, and that the system is shut down. "0" means that it does not impede the system, and the alarm is not actuated.

FIG. 2 shows the normal operating condition with both electrodes submerged. The fuel valve is open, the make up water is closed. Switching element 56 of relay 55 is open so there is no out of sequence condition to sound the alarm.

FIG. 3 shows the condition where the water level is between the two electrodes. The top electrode has switched relay 40 as to close the fuel valve by contacting blank contact 52, even though relay 55 would permit it. However, relay 40 has closed the circuit to the make-up water solenoid valve to add make-up water by contacting contact 53. Again there is no out of sequence action. This circuit is also open at contact 50.

FIG. 4 shows an abnormal situation which is a cause of concern because it indicates that the upper electrode is submerged and the lower one is not. Clearly this is absurd, and means that there is a control system malfunction. The cause of the malfunction could be benign or could be serious, but in any event it should be corrected before the boiler should be permitted to operate again.

In this situation, element 41 assists in completing the alarm circuit, along with element 56. The buzzer sounds and the alarm lights. Although element 43 of the upper water level relay 40 would permit fuel supply, element 57 of the lower level relay prevents it. Element 48 of the upper water level relay 40 opens, and make up water cannot be added. The system is totally shut down and the alarm will be sounding. Now the operator must actively investigate the situation in order to restart the system.

FIG. 5 shows the circumstances of a low water level, below the bottom electrode. This condition can be reached without an alarm, because it could occur in a normal sequence. It does permit make up water to be supplied because the abnormal situation of FIG. 4 has not occurred. Notice that fuel will remain cut off until the upper electrode is submerged.

Further as to the condition of FIG. 4, reset electronics may be provided with latch circuitry (not shown) which will prevent the condition of either relay from being changed until the operator presses the reset button to energize upper level relay 40. This will open the make-up water valve, but not the fuel valve, and corresponds to the settings of FIG. 5, which will prevail until the condition of FIG. 8 has been gone through and the condition of FIG. 2 has been attained. Then the fuel can again be supplied.

This invention thereby provides a boiler control Which is sophisticated in its results but simple to maintain and operate. Potentially dangerous conditions of application of heat With insufficient Water as the consequence of system malfunction are thereby prevented.

This invention is not to be limited by the embodiment shown in the drawings and described in the description, which is given by way of example and not of limitation, but only in accordance with the scope of the appended claims.

I claim:

1. In a boiling water boiler having a boiler tank which is externally fired by a burner under control of a fuel supply valve, and is supplied with make-up water through a make-up water valve, both of said valves being under the control of a control system, said control system including an upper control level sensor disposed at an elevation in the tank at the lowermost water level at which firing is to be enabled, and below which firing is not to be enabled, and a lower control level sensor disposed at an elevation below the upper sensor, the improvement comprising:

said circuitry including said sensors and means for applying electrical current to them which will flow through the respective sensor when said sensor is submerged, but not when it is not submerged;

level electronics means responsive to flow or absence of flow through said sensors;

switching means connected to said fuel valve and to said make-up water valve, enabling flow to fuel through said fuel valve when both sensors are submerged, and preventing it when either sensor is not submerged, which enables flow of water through said makeup water valve when either of said sensors is not submerged, except in the anomalous condition when said upper sensor indicated it is submerged and said lower sensor indicates it is not submerged, in which event flow of both fuel and water through their respective valves are prevented;

said circuitry further including lock-out means which prevent automatic resumption of fuel flow and of make-up water flow by said switching means in the event that said anomalous condition has existed, resumption of either flow being enabled only after the switching means respective to said upper control level sensor has been initiated to enable make-up water to be provided sufficient to submerge said lower control level sensor and provided that said anomalous condition is not re-asserted.

2. Apparatus according to claim 1 in which an alarm circuit responsive to said anomalous condition is actuated by the level electronics when said anomalous condition exists, and continues to be actuated and to prevent resumption of fuel flow or make-up water flow until reenabled by external manipulation.

3. Apparatus according to claim 1 in which said switching means comprises relays responsive to actuators which in turn are responsive to current flow through said sensors.

* * * * *